United States Patent
Hassner et al.

(10) Patent No.: US 6,928,515 B2
(45) Date of Patent: Aug. 9, 2005

(54) INTEGRATED SECTOR FORMAT-ERROR CORRECTION CODE SYSTEM AND METHOD FOR EFFICIENT WRITING IN A DISK ARRAY SYSTEM

(75) Inventors: Martin Aureliano Hassner, Mountain View, CA (US); Steven R. Hetzler, Los Altos, CA (US); Spencer W. Ng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 10/291,087

(22) Filed: Nov. 9, 2002

(65) Prior Publication Data

US 2004/0093464 A1 May 13, 2004

(51) Int. Cl.[7] ................................................ G06F 11/10
(52) U.S. Cl. ........................... 711/114; 714/52; 714/54
(58) Field of Search ............................ 711/6, 112, 114; 714/52, 54

(56) References Cited

U.S. PATENT DOCUMENTS

| | | | |
|---|---|---|---|
| 5,124,987 A | * 6/1992 | Milligan et al. ................ 714/7 |
| 5,274,799 A | 12/1993 | Brant et al. .................. 395/575 |
| 5,283,791 A | 2/1994 | Halford ...................... 371/40.4 |
| 5,502,835 A | 3/1996 | Le et al. ..................... 395/496 |
| 5,566,318 A | 10/1996 | Joseph ........................ 395/445 |
| 5,579,474 A | 11/1996 | Kakuta et al. ........... 395/182.04 |
| 5,737,344 A | 4/1998 | Belser et al. ................ 714/766 |
| 5,859,965 A | 1/1999 | Gittins et al. .......... 395/185.05 |
| 5,875,458 A | 2/1999 | Niijima et al. ............... 711/114 |
| 5,964,895 A | 10/1999 | Kim et al. ................... 714/758 |
| 6,038,570 A | 3/2000 | Hitz et al. ................... 707/204 |
| 6,088,775 A | 7/2000 | Inoue et al. ................. 711/167 |
| 6,138,126 A | 10/2000 | Hitz et al. ................... 707/202 |
| 6,256,717 B1 | 7/2001 | Inoue et al. ................. 711/167 |
| 6,751,757 B2 | * 6/2004 | Biskup et al. ................. 714/54 |
| 6,807,642 B2 | * 10/2004 | Yamamoto et al. ............ 714/6 |
| 2004/0088485 A1 | * 5/2004 | Shang ......................... 711/114 |

FOREIGN PATENT DOCUMENTS

JP 588987 4/1993 ........... G06F/12/16

OTHER PUBLICATIONS

"Mylex SANArray™ FFx–2, The New Industry Leader," 2001.
"Method for Data Transfer for Raid Subsystem" IBM Technical Disclosure Bulletin, vol. 39, No. 8, Aug. 1996, pp. 99–100.
"Chapter 7, Disk Subsystem," Tuning Netfinity Servers for Performance—Getting the most our of Windows 2000 and Windows NT 4.0, 1998, pp. 119–175.

* cited by examiner

*Primary Examiner*—Jack A. Lane
(74) *Attorney, Agent, or Firm*—Samuel A. Kassatly

(57) ABSTRACT

A system and associated method efficiently complete write commands in an ISF disk drive/RAID system with minimal disk accesses to the underlying disk drives. The system updates data in a parity-based disk array system by receiving a write command to write new data. The present system minimizes the number of disk accesses. The present system completes the same or comparable write commands in a total of four accesses to the disk drives. This is realized by combining the read-modify-write operation of updating one or more sectors in an ISF cluster with the read-modify-write operation associated with updating one or more sectors in a parity-based array system, such as a RAID-5 system.

42 Claims, 8 Drawing Sheets

INTEGRATED SECTOR FORMAT-ERROR CORRECTION CODE SYSTEM AND METHOD FOR EFFICIENT WRITING IN A DISK ARRAY SYSTEM

CROSS-REFERENCE TO RELATED APPLICATION

The present application relates to co-pending U.S. patent application, titled "Multiple Level (ML), Integrated Sector Format (ISF), Error Correction Code (ECC) Encoding And Decoding Processes For Data Storage Or Communication Devices And Systems," Ser. No. 10/040,115, filed on Jan. 3, 2002, which is assigned to the same assignee as the present application, and which is incorporated herein by reference in its entirety.

FIELD OF THE INVENTION

The present invention relates to the field of data storage, and particularly to disk array systems. More specifically, this invention relates to a system and associated method for efficiently executing write commands when using an integrated sector format (ISF)—error correction code (ECC) system in a parity-based disk array system.

BACKGROUND OF THE INVENTION

In Redundant Arrays of Independent Disk (RAID) systems, data files and related parity are striped across multiple disk drives. In storage subsystems which manage multiple hard disk drives as a single logical direct access storage device (DASD), the RAID logic is implemented in the controller of the subsystem.

RAID storage methodologies have also been implemented in software for execution on a single host computer. This allows the single host computer, such as a personal computer, to implement RAID storage techniques on local hard disk drives.

One challenge in shared disk systems implementing a parallel, shared disk RAID architecture is to provide a system for insuring that data and parity data are properly updated to disks in the system.

The Integrated Sector Format (ISF) disk drive is a relatively new standard for improving the error correcting capabilities of a disk drive. Current disk drives have a single level of error correcting code (ECC) for each individual sector. ISF improves this architecture by grouping every eight (8) consecutive sectors into a cluster and adding a second and a third level of ECC to each cluster. The third level ECC is computed over all 8 sectors. These two levels of additional ECC's provide the additional error correction capabilities above and beyond those provided by the first level of ECC. An exemplary ISF method is described in U.S. patent application, titled "Multiple Level (ML), Integrated Sector Format (ISF), Error Correction Code (ECC) Encoding And Decoding Processes For Data Storage Or Communication Devices And Systems," Ser. No. 10/040,115, filed on Jan. 3, 2002, supra.

In an ISF disk drive when a fraction of a cluster is updated (i.e., written), the drive first reads the cluster into its buffer memory, inserts the new sectors that are updated, re-computes the new ECCs, and then writes the cluster back to the disk media. This process which is referred to as a read-modify-write action, adds one revolution to the time of the write command at a performance penalty.

The most common RAID systems are based on parity schemes to provide added fault tolerance. For illustration purpose only, the RAID-5 system will be described to illustrate the invention, with the understanding that other parity-based disk array systems may be used.

In a RAID-5 system, to update (or write) a small piece of data, the RAID controller first reads the old data in that location, reads the corresponding old parity from the corresponding parity drive, and XOR (exclusive OR) them with the new data to generate the new parity, after which it can write the new data to the data drive and the new parity to the parity drive. In other terms, the RAID controller needs to do read-modify-write of the data drive and the parity drive. Again, the read-modify-write procedure imposes a performance penalty to the write command execution.

In the combination of ISF disk drives used in a RAID-5 system, it could take for example a total of six disk accesses to complete a write command: three accesses to the data drive and three other accesses to the parity drive. What is therefore needed is a system and associated method for minimizing the accesses to the ISF data drive to complete a write command.

SUMMARY OF THE INVENTION

The present invention satisfies this need and presents a system, a computer program product, and an associated method (collectively referred to herein as "the system" or "the present system") for completing write commands in an ISF disk drive/RAID system with minimal disk driver accesses. As In the example above where six accesses are required, the present system completes the same or comparable write commands in a total of four accesses to the disk drives.

The foregoing and other features and advantages of the present invention are realized by combining the read-modify-write operation of updating one or more sectors in an ISF cluster with the read-modify-write operation associated with updating one or more sectors in a parity-based array system, such as a RAID-5 system.

In a first preferred embodiment, a parity-based disk array system updates data by receiving a write command to write new data. Thereupon, an array controller issues a read command to a data storage device to read a data block containing the data to be updated, and further issues a read command to a parity storage device to read a parity block containing a parity to be updated that corresponds to the data to be updated.

The controller reads the data block containing the data to be updated, and saves the data block in memory. The controller also reads the parity block containing the parity to be updated, and saves the parity block in memory. Both the data block and the parity block are ISF clusters of the underlying disk drives.

The controller then generates a new parity that corresponds to the new data. The new data is inserted into the data ISF cluster replacing the old data, and the new parity is inserted into the parity ISF cluster replacing the old parity. Thereupon, the controller writes the new data block on the data drive, and the new parity block on the parity drive. Because the disk drives receive writes that are ISF clusters, new ISF ECC can be calculated and the clusters written without having to do any read.

Another preferred embodiment is similar to the prior embodiment but distinguishes thereover in that the array controller issues a new "read with intent to update" command instead of the standard read command, for both the data and the parity. The array controller then generates a new parity that corresponds to the new data, and writes the new data on the data drive, and the new parity on the parity drive.

Upon receiving a "read with intent to update" command, a disk drive reads the entire ISF cluster containing the requested sectors and saves the cluster in its buffer memory. When it subsequently receives the write command for those sectors, it replaces those sectors in its buffer with the new data and calculates the new ISF ECC for the cluster, which then can be written to the disk.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
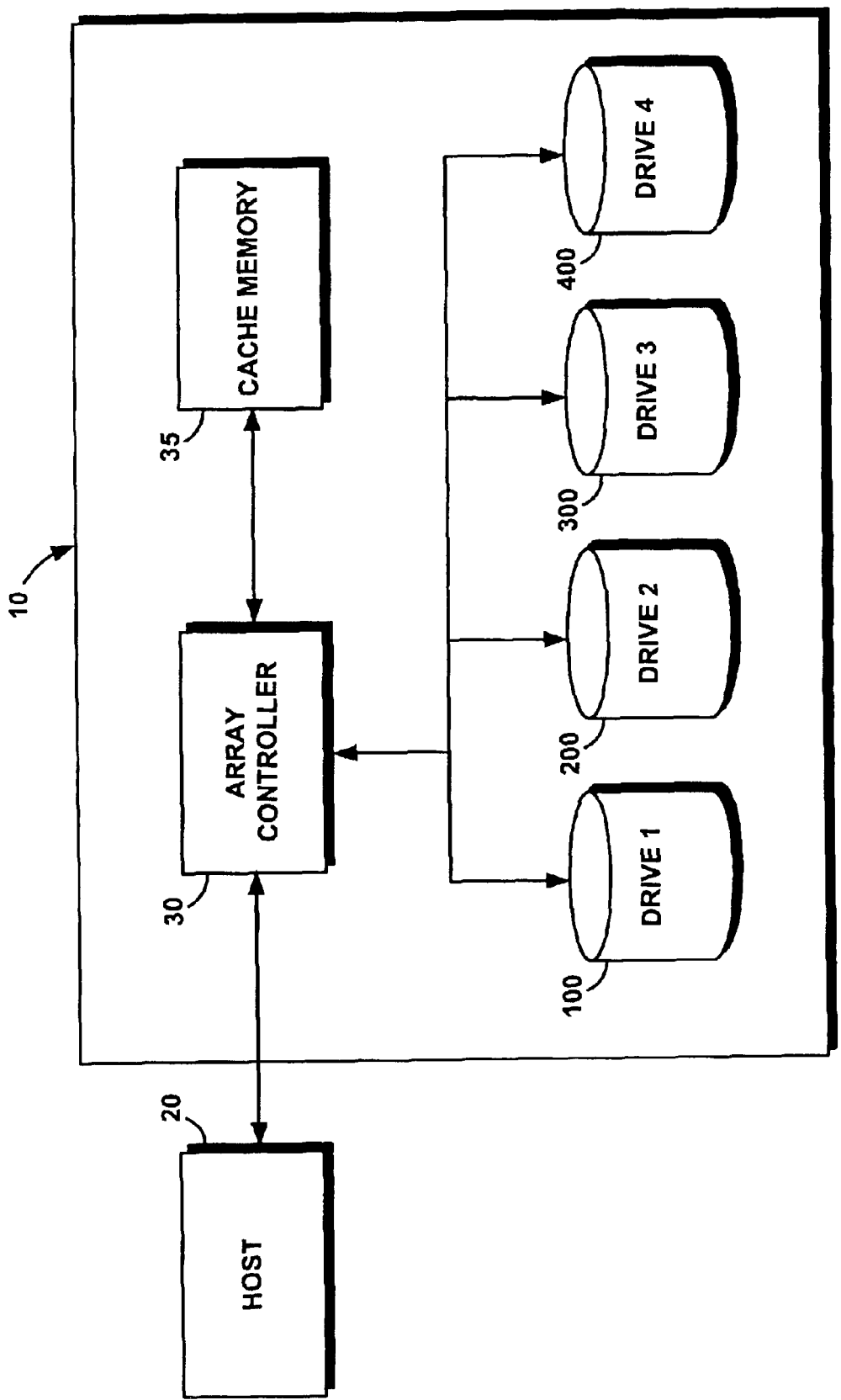
FIG. 1 is a schematic illustration of an exemplary environment in which a system and associated method for efficiently writing commands can be used with an integrated sector format (ISF)—error correction code (ECC) in a parity-based disk array system.
Figure 1A:
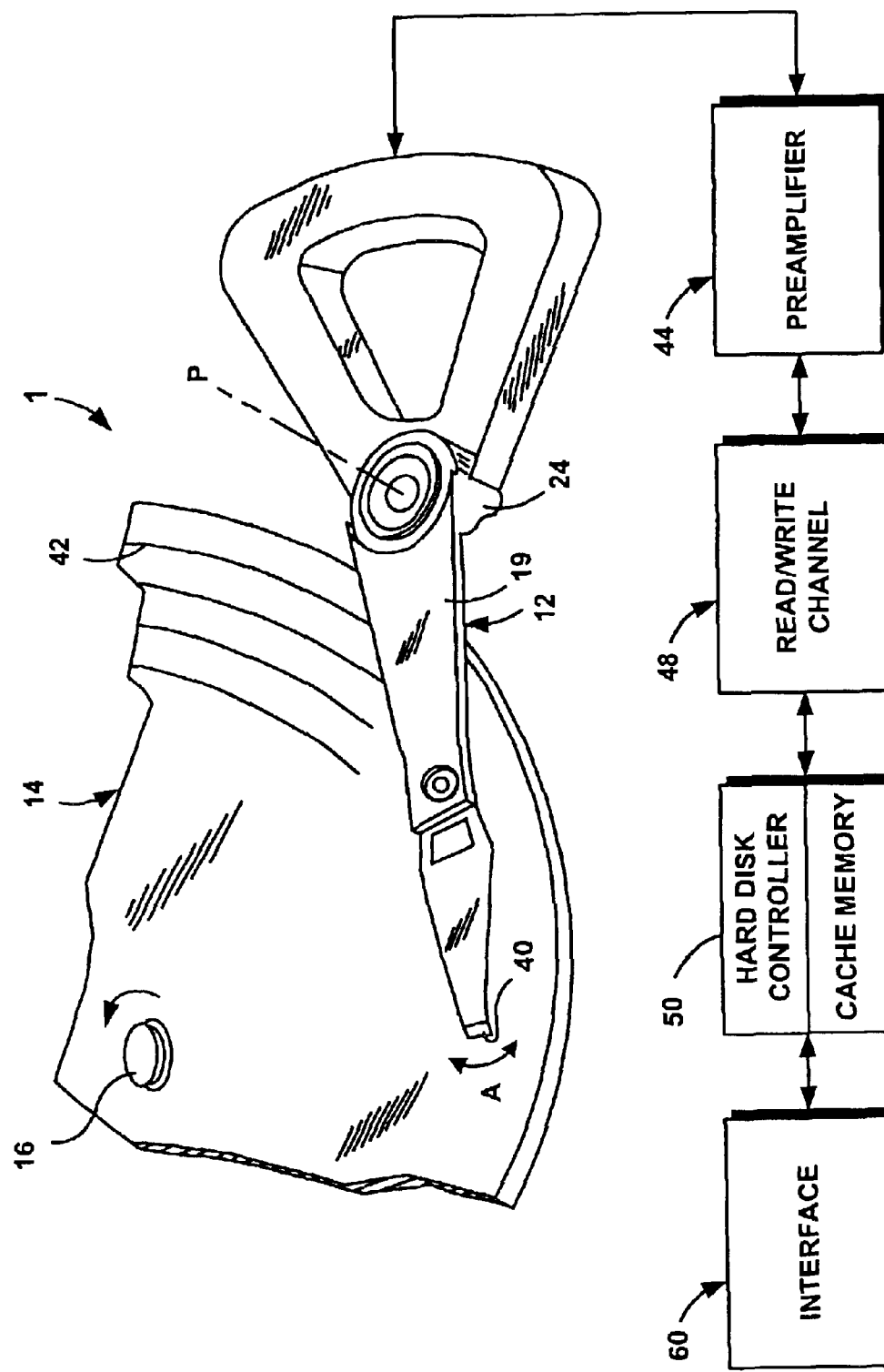
FIG. 1A is a schematic illustration of a data storage device, such as a disk drive, that applies the system and method of the present invention.
Figure 1B:
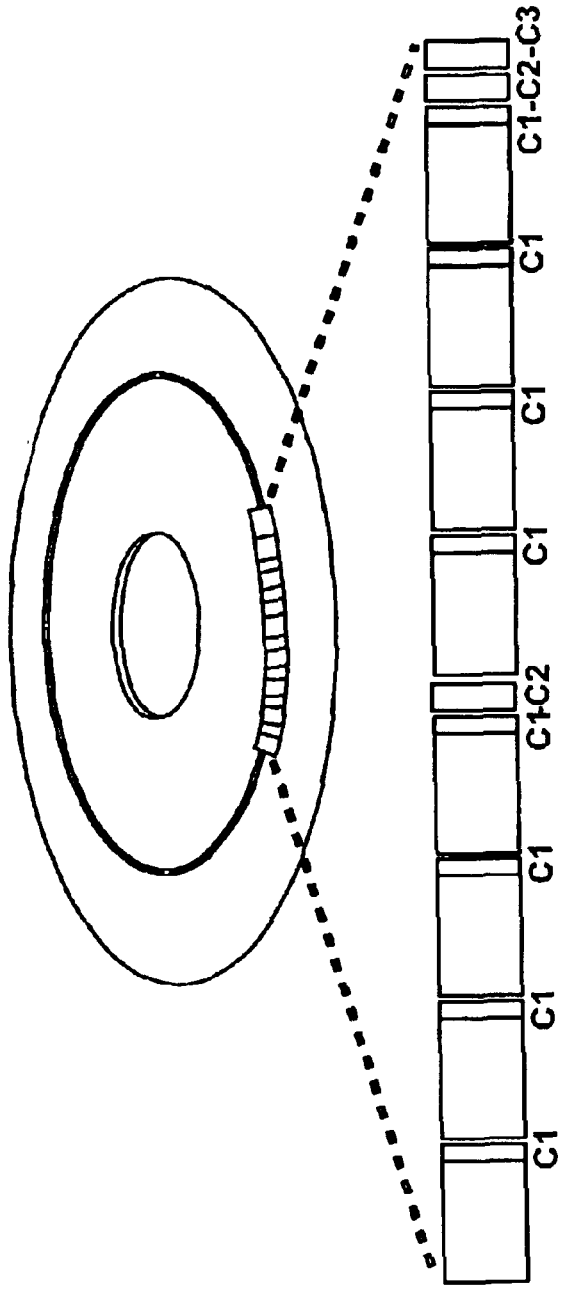
FIG. 1B provides an illustration of an integrated sector ECC format.

FIGS. 1, 1A and 1B illustrate an exemplary environment in which a system 10 and associated method for efficiently writing commands using an integrated sector format (ISF)—error correction code (ECC) system in a parity-based disk array system. A host computer 20 is connected to an array controller 30 of system 10.

FIG. 1A illustrates a disk drive 1 comprised of a head stack assembly 12 and a stack of spaced apart magnetic, optical and/or MO data storage disks or media 14 that are rotatable about a common shaft 16. The head stack assembly 12 includes a number of actuator arms 19 that extend into spacings between the disks 14, with only one disk 14 and one actuator arm 19 being illustrated for simplicity of illustration. The disk drive 1 further generally includes a preamplifier 44, a read/write channel 48, a disk cache memory 49, and a hard disk controller 50. The disk drive 1 is attached either to a computer or a storage system controller, such as array controller 30, through an interface 60. Examplary interfaces include but are not limited to SCSI, IDE, FC, and Firewire.

The head stack assembly 12 is generally comprised of an E-shaped block 24 and a magnetic rotor 26 attached to the block 24 in a position diametrically opposite to the actuator arms 19. The rotor 26 cooperates with a stator (not shown) for the actuator arms 19 to rotate in a substantially radial direction, along an arcuate path in the direction of an arrow A. Energizing a coil of the rotor 26 with a direct current in one polarity or the reverse polarity causes the head stack assembly 12, including the actuator arms 19, to rotate around axis P in a direction substantially radial to the disks 14. A head disk assembly 33 is comprised of the disks 14 and the head stack assemblies 12.

A transducer head 40 is mounted on the free end of each actuator arm 20 for pivotal movement around axis P. The magnetic rotor 26 controls the movement of the head 40 in a radial direction, in order to position the head 40 in registration with data information tracks or data cylinders 42 to be followed, and to access particular data sectors on these tracks 42.

FIG. 1B is an example of ISF formatting. An ISF cluster of eight sectors is depicted. Each sector is protected with a first level of error correcting code (ECC), C1. The first group of four sectors of the cluster is protected with a second level of ECC, C2. Similarly, the second group of four sectors is protected with a second level of ECC, C2. Lastly, the entire group of eight sectors of the ISF cluster is protected with a third level of ECC, C3.

Figure 2:
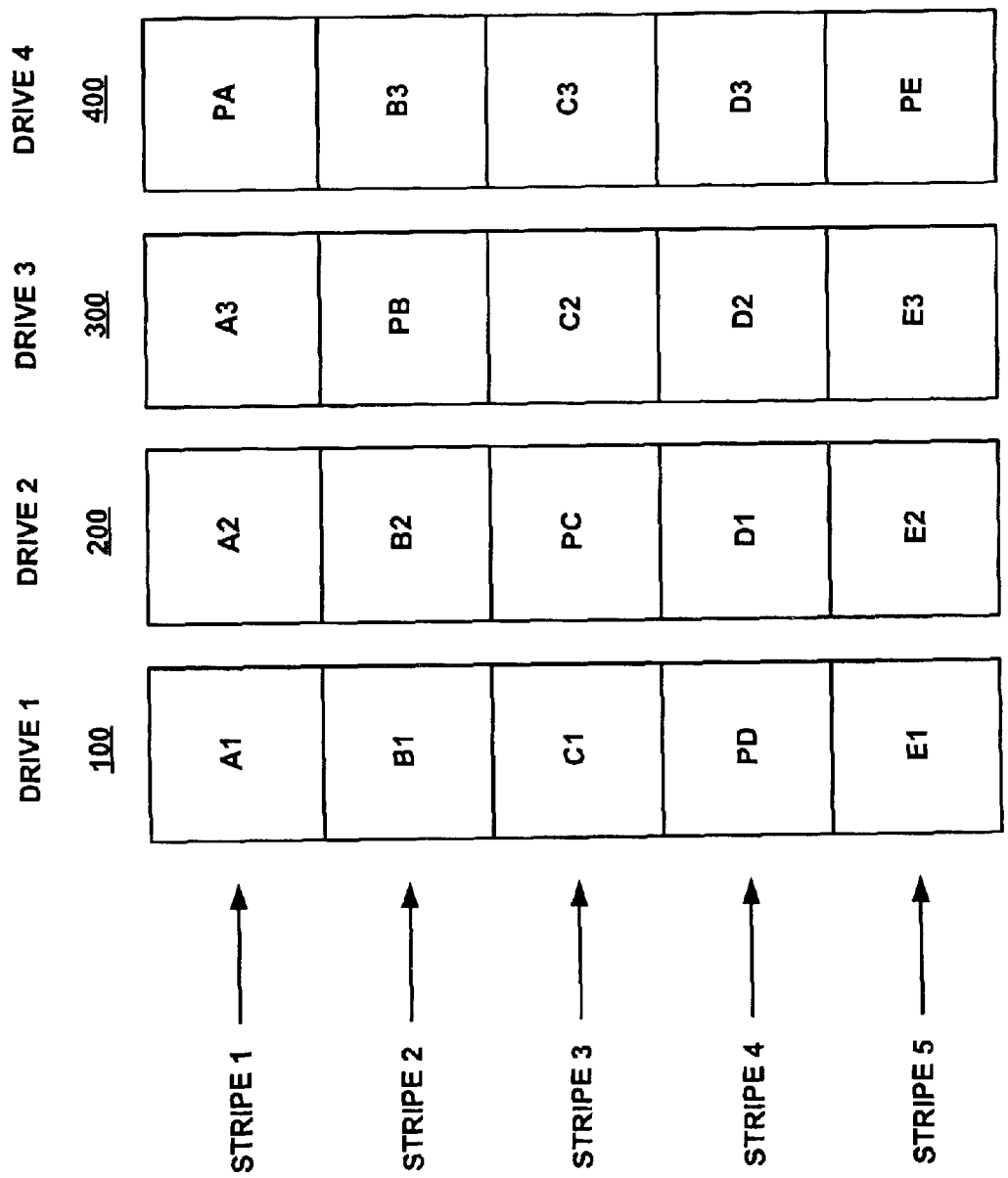
FIG. 2 illustrates an exemplary distribution of data and parity blocks that are arranged on four storage devices that form part of the parity-based disk array system of FIG. 1.

FIG. 2 is an example of a four-disk RAID-5 data layout, where the letters A, B, C, D, and E designate data blocks of different stripes, and Px designates the parity block for the three x data blocks of its stripe. The array controller 30 manages drives 100, 200, 300, 400 and thus knows the boundaries of the array data blocks and the boundaries of the parity blocks. Thus, for illustration purpose only, array block A1 could be comprised of ISF clusters A11, A12, A13, A14, etc., and array block A2 could be comprised of ISF clusters A21, A22, A23, A24, etc., and parity block PA could be comprised of ISF clusters PA1, PA2, PA3, PA4, etc.

In a first preferred embodiment, the array controller 30 is cognizant of the fact that the storage devices 100, 200, 300, 400, use ISF format, and it also knows the boundaries of the ISF clusters in those storage devices. It should be noted that the blocks in a stripe of a RAID-5 system have no correlation with the clusters of ISF formatting. In a second preferred embodiment, the array controller 30 does not have to know the boundaries of the ISF clusters of the underlying storage devices.

An exemplary write command operation or method 302 according to one embodiment of the present invention will now be explained with further reference to FIG. 3. As indicated earlier, the disk array blocks and ISF clusters are independent entities.

Figure 3A:
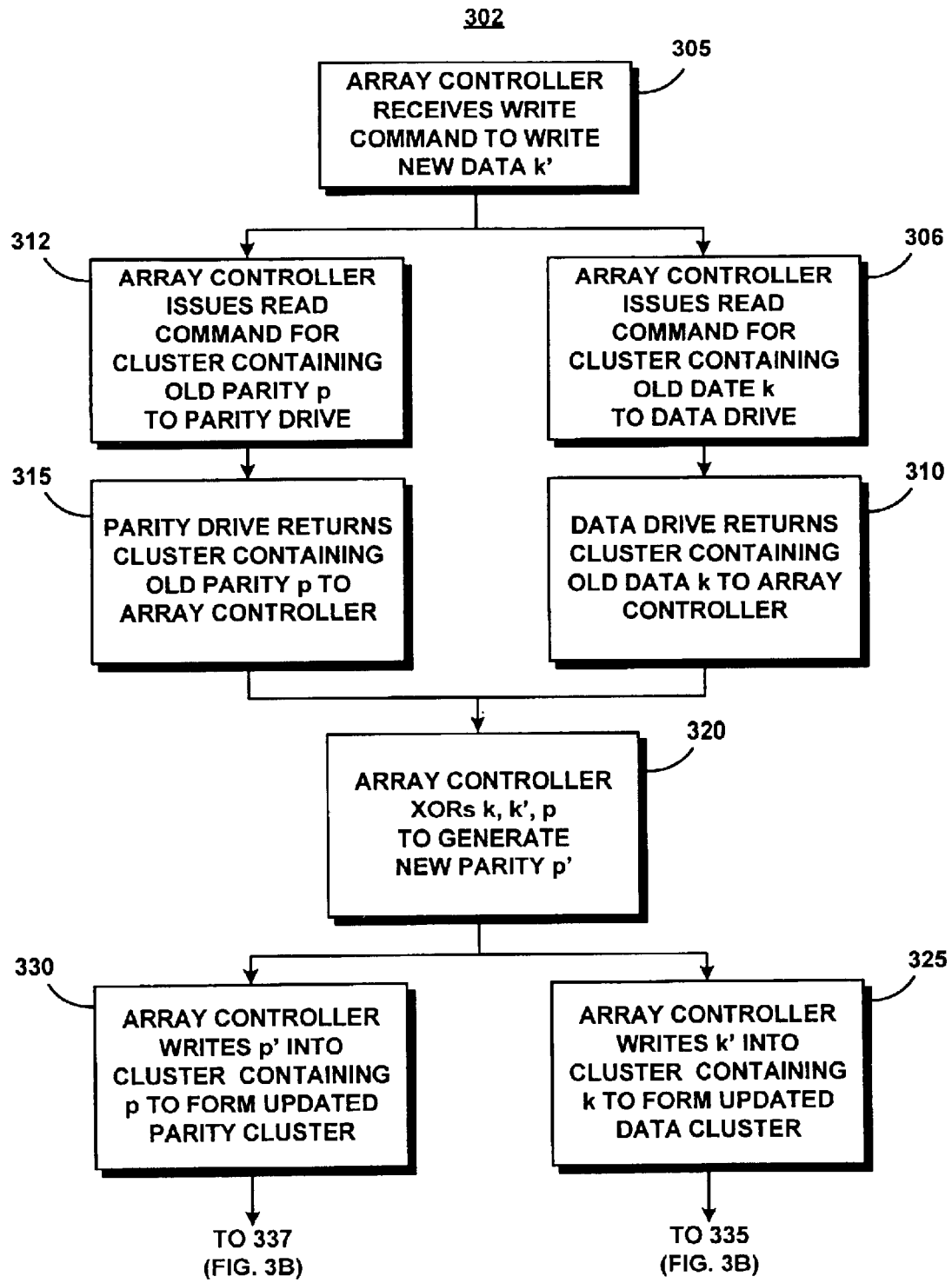
FIG. 3 is comprised of FIGS. 3A and 3B, and is a functional flow chart that illustrates an exemplary write command operation according to a preferred embodiment of the present invention.
Figure 3B:
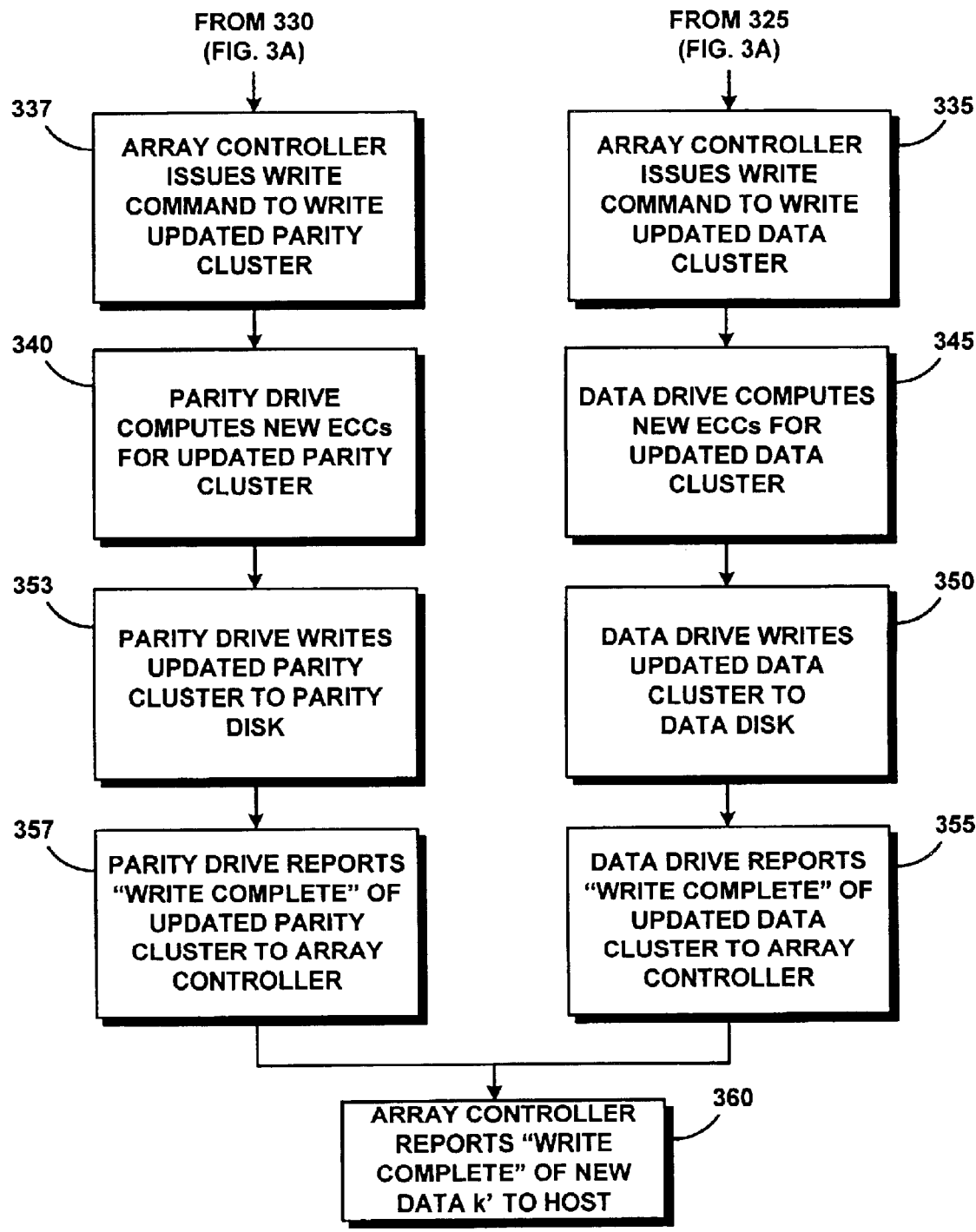

The RAID controller 30 in FIG. 3 is cognizant of the fact that the storage devices 100, 200, 300, 400, use ISF format and it also knows the boundaries of the ISF clusters in those storage devices.

The RAID or array controller 30 receives a Write command to write new (or updated) data k' from the host computer 20 at step 305. At step 306, the array controller 30 issues a Read command to the data drive, i.e., drive 1 (100), to read the cluster, i.e., A12, containing the old data k. While in this example data k is contained entirely within one ISF cluster, if it spans multiple clusters, then the Read command will read all those clusters. Thus, when the array controller 30 implements a read-modify-write operation, instead of reading just the sector to be updated that contains the old data k, the array controller 30 reads the cluster containing this sector, which in turn, contains the old data k.

At step 310, the data drive, i.e., drive 1, reads the requested cluster A12 containing the old data k, and returns it to the array controller 30, which, in turn, saves this data block in memory 35 (FIG. 1).

Similarly, at step 312, the array controller 30 issues a Read command to the parity drive, i.e., drive 4 (400) to read the cluster, i.e., PA2, containing the old parity p that corresponds to the old data k. At step 315 the parity drive, i.e., drive 4, reads the requested cluster PA2 containing the old parity p, and returns it to the array controller 30, which, in turn, saves this parity block in memory 35.

At step 320, the array controller 30 implements an exclusive OR operation onto the old data k, the new data k', and the old parity p, to generate the new parity p', as indicated by the following expression (1):

$$p' \oplus k + k' \oplus p \qquad (1)$$

At step 325, the array controller 30 writes the new data k' onto the cluster A12 in its memory 35 that contains the old data k, to form an updated cluster A'12. Similarly, at step 330, the array controller 30 concurrently writes the new parity p' onto the cluster PA2 in its memory 35 that contains the old parity p, to generate an updated cluster P'A2.

At step 335, the array controller 30 issues a Write command to the data drive 1 (100) to write the updated cluster A'12 that contains the new data k'. Concurrently, at step 337, the array controller 30 further issues a Write command to the parity drive 4 (400) to write the updated cluster P'A2 that contains the new parity p'.

At step 345, the controller 50 for the data drive 1 (100) computes the new error correction codes (ECCs) for the updated cluster A'12, using methodology that is known or available. At step 350, the controller 50 of data drive 1 (100) writes the updated cluster A'12 with its new ECC onto the disk 14 of data drive 1 (100). At step 355, the data drive controller 50 reports to the array controller 30 that the write operation of the updated data block A'1 has been successfully completed.

Similarly and concurrently with steps 345, 350, 355, the controller 50 for the parity drive 4 (400) computes the new error correction codes (ECCs) for the updated cluster P'A2. At step 353, the controller 50 of parity drive 4 (400) writes the updated cluster P'A2 onto the disk 14 of parity drive 4 (400). At step 357, the parity drive controller 50 reports to the array controller 30 that the write operation of the updated cluster P'A2 has been successfully completed.

Subsequently, at step 360, the array controller 30 reports to the host computer 20 that the write operation of the new data k' has been completed.

Figure 4A:
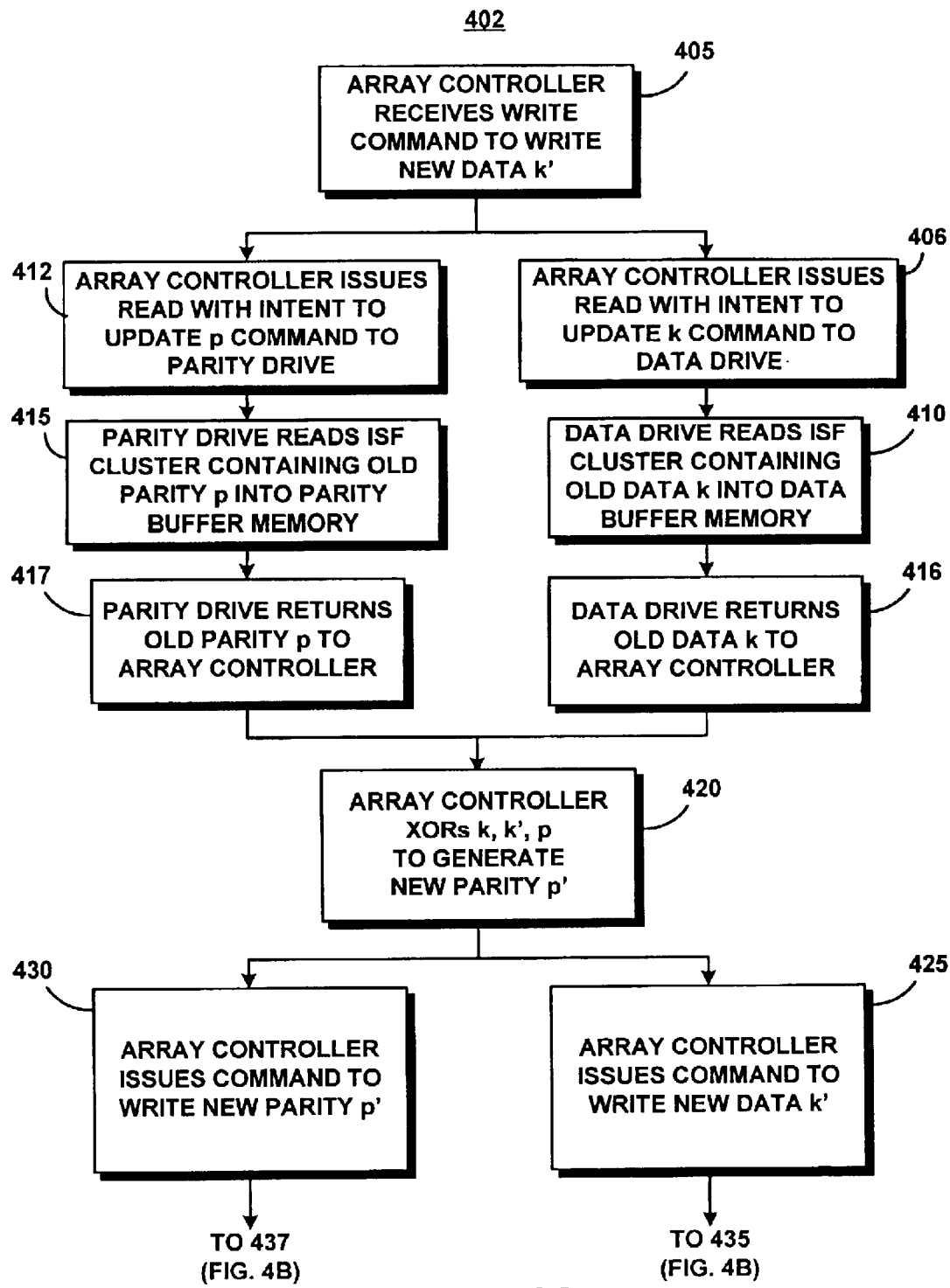
FIG. 4 is comprised of FIGS. 4A and 4B, and is a functional flow chart that illustrates an exemplary write command operation according to another embodiment of the present invention.
Figure 4B:
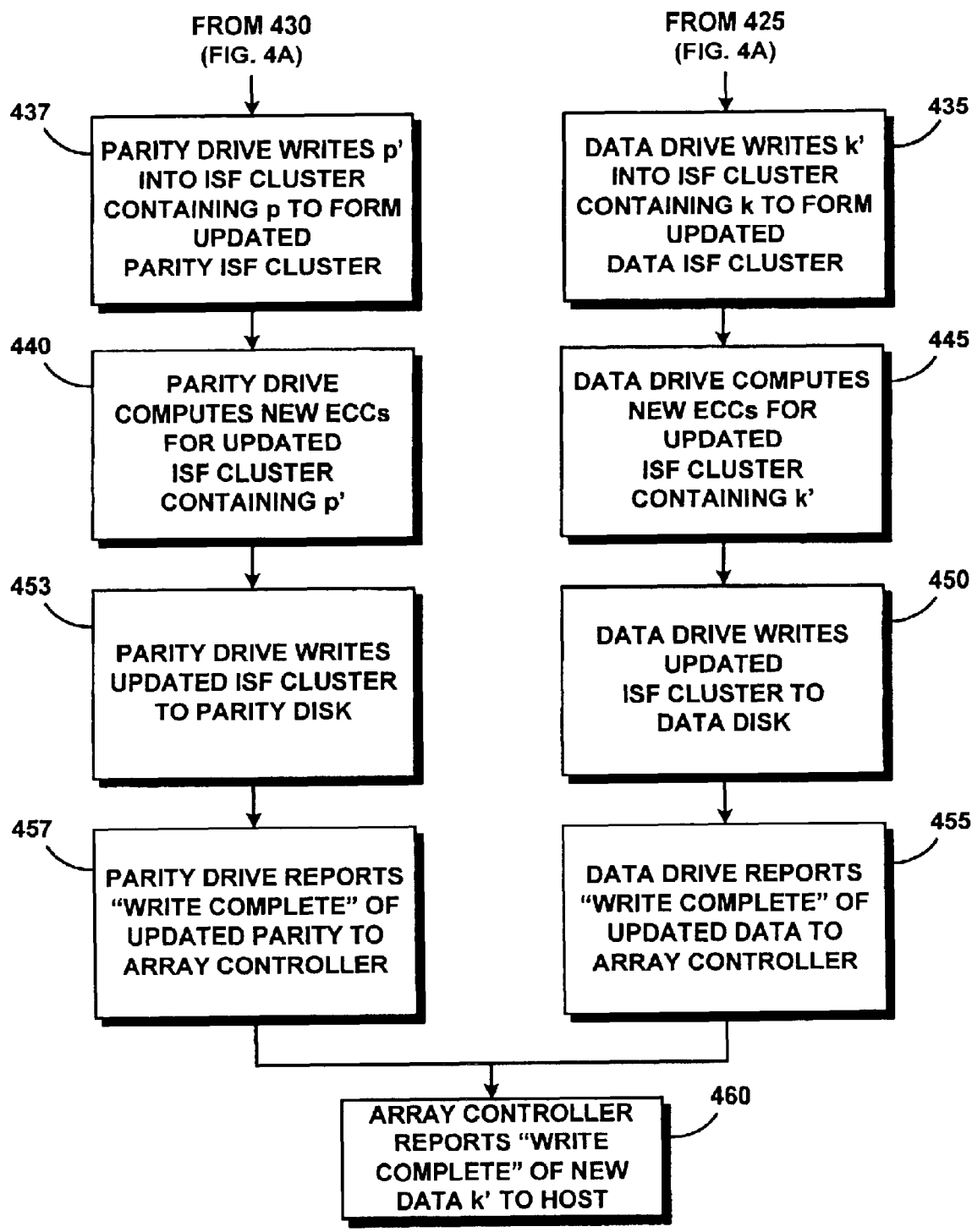

FIG. 4 illustrates an exemplary write command operation or method 402 according to another embodiment of the present invention. The RAID or array controller 30 receives a Write command to write new (or updated) data k' from the host computer 20 at step 405. This embodiment introduces a new command called "Read With Intent To Update," which will be referred to herein as "RWIU." This RWIU command can be implemented using a new command code, or it can be implemented by assigning an unused bit in the command register of an existing read command code as its flag.

The purpose of this new RWIU command is to provide a hint to the disk drive controller that the read command will be followed shortly by a write command to the same block as part of some read-modify-write operation. The use of this RWIU command is in system 10. The array controller 30 is cognizant of the fact that the underlying disk drives are ISF drives, but it does not need to know where the ISF cluster boundaries are.

Then, at step 406, instead of issuing Read command to read the old data k to the data drive 1 (100), array controller 30 issues a RWIU k command to read the old data k and hint its intent to update it. Similarly, at step 412, instead of issuing a Read command to read the old parity p to the parity drive, the array controller 30 issues a RWIU p command to read the old parity p and hint its intent to update it.

On receiving the RWIU k command, the data drive controller 50 reads the ISF cluster containing k into its buffer memory 49 at step 410, and tries to store it there until it has been modified. This can be accomplished, as an example, by placing that entry at the top of its most-recently-used (MRU) list.

Similarly, at step 415, on receiving the RWIU p command, the parity drive reads the ISF cluster containing the parity p into its buffer memory 49 and tries to store it there until it has been modified. At steps 416 and 417, the data drive 1 (100) and the parity drive 4 (400) return old data k and the old parity p, respectively, to the array controller 30.

At step 420, after receiving the old data k and parity p, the array controller 30 implements an exclusive OR operation (XOR) on the old data k, the new data k', and the old parity p, to generate the new parity p', as indicated by expression (1) above.

At step 425, the array controller 30 issues a write command to the data drive 1 (100) to write the new data k'. Similarly, at step 430, the array controller 30 concurrently issues a write command to the parity drive 4 (400) to write the new parity p'.

Because the ISF cluster containing k is already in the buffer 49 of the data drive 1 (100), the data drive controller 50 can directly replace the old data k in the ISF cluster containing k with the new data k' in the buffer at step 435. Then, at step 445, the data drive controller 50 computes the new error correction codes (ECCs) for the updated ISF cluster containing k', using methodology that is known or available.

At step 450, the controller 50 of data drive 1 (100) writes the updated ISF cluster containing k' onto the disk 14 of data drive 1 (100). At step 455, the data drive controller 50 reports to the array controller 30 that the write operation of new data k' has been successfully completed.

Similarly, and concurrently with steps 435, 445, 450, 455, since the ISF cluster containing p is already in the buffer 49 of the parity drive 4 (400), the parity drive controller 50 can directly replace the old parity p in the ISF cluster containing p with the new parity p' in the buffer at step 437. Then, at step 440, the parity drive controller 50 computes the new error correction codes (ECCs) for the updated ISF cluster containing p', using methodology that is known or available.

At step 453, the controller 50 of parity drive 4 (400) writes the updated ISF cluster containing p' onto the disk 14 of parity drive 4 (400). At step 457, the parity drive controller 50 reports to the array controller 30 that the write operation of new parity p' has been successfully completed.

Subsequently, at step 460, the array controller 30 reports to the host computer 20 that the write operation of the new data k' has been completed.

It is to be understood that the specific embodiments of the invention that have been described are merely illustrative of certain application of the principle of the present invention. Numerous modifications may be made to the system and associated method described herein, without departing from the spirit and scope of the present invention. For example, while the present invention has been described herein in connection with a disk array system, it should be clear that the present invention is similarly applicable to shared disk systems.

What is claimed is:

1. A method of updating data k in a multiple level disk array system, comprising:

receiving a write command to write new data k';
issuing a read command to a data storage device to read a data cluster containing the data k to be updated;
reading the data cluster containing the data k;
saving the data cluster in an array controller memory;
issuing a read command to a parity storage device to read a parity cluster containing a parity p to be updated that corresponds to the data k;
reading the parity cluster containing the parity p;
saving the parity cluster in the array controller memory;
generating a new parity p' that corresponds to the new data k;
writing the new data k' on the data drive;
writing the new parity p' on the parity drive; and
wherein the data cluster and the parity cluster are integrated sector format clusters.

2. The method of claim 1, further comprising writing the new data k' onto the data block saved in the array controller memory to generate an updated data cluster.

3. The method of claim 2, further comprising writing the new parity p' onto the parity block saved in the array controller memory to generate on updated parity cluster.

4. The method of claim 3, further comprising issuing a write command to the data drive to write the updated data cluster.

5. The method of claim 4, further comprising issuing a write command to the parity drive to write the updated parity cluster.

6. The method of claim 5, further comprising computing new error correction codes for the updated data cluster.

7. The method of claim 6, further comprising writing the updated data cluster onto the disk of the data drive.

8. The method of claim 7, further comprising reporting that the updated data cluster has been successfully written.

9. The method of claim 8, further comprising computing new error correction codes for the updated parity cluster.

10. The method of claim 9, further comprising writing the updated parity cluster onto the disk of the parity drive.

11. The method of claim 10, further comprising reporting that the updated parity cluster has been successfully written.

12. The method of claim 11, further comprising reporting that the new data k' has been successfully written.

13. The method of claim 1, wherein disk array system comprises a RAID system.

14. The method of claim 1, wherein the data cluster comprises a cluster of sectors.

15. The method of claim 1, wherein the data cluster comprises a group of sector clusters.

16. The method of claim 1, wherein saving the data cluster in memory comprises saving the data cluster in a cache memory.

17. The method of claim 1, wherein generating the new parity p' implementing an exclusive OR operation onto the data k, the parity p, and the new data k', as follows:

$$p' = k \oplus k' \oplus p.$$

18. A method of implementing a write command in a multiple level disk array system, comprising:
receiving a write command to write new data k';
issuing a read command to a data storage device to read a data cluster containing the data k to be updated;
reading the data cluster containing the data k;
saving the data cluster in a memory;
issuing a read command to a parity storage device to read a parity cluster containing a parity p to be updated that corresponds to the data k;
reading the parity cluster containing the parity p;
saving the parity cluster in the memory;
generating a new parity p' that corresponds to the new data k';
writing the new data k' on the data drive;
writing the new parity p' on the parity drive; and
wherein the data cluster and the parity cluster are integrated sector format clusters.

19. A method of updating data k in a multiple level disk array system, comprising:
receiving a write command to write new data k';
issuing a read with intent to update command to a data storage device to read the data k to be updated;
reading the data cluster containing the data k;
saving the data cluster in a data drive memory;
issuing a read with intent to update command to a parity storage device to read a parity p to be updated that corresponds to the data k;
reading the parity cluster containing the parity p;
saving the parity cluster in a parity drive memory;
generating a new parity p' that corresponds to the new data k';
writing the new data k' on the data drive;
writing the new parity p' on the parity drive; and
wherein the data cluster and the parity cluster are integrated sector format clusters.

20. The method of claim 19, further comprising issuing a write command to the data drive to write the new data.

21. The method of claim 20, further comprising writing the new data k' onto the data cluster saved in the data drive memory to generate an updated data cluster.

22. The method of claim 19, further comprising issuing a write command to the parity drive to write the new parity.

23. The method of claim 22, further comprising writing the new parity p' onto the parity cluster saved in parity drive memory to generate an updated parity cluster.

24. The method of claim 23, further comprising computing new error correction codes for the updated data cluster.

25. The method of claim 24, further comprising writing the updated data cluster onto the disk of the data drive.

26. The method of claim 25, further comprising reporting that the updated data has been successfully written.

27. The method of claim 26, further comprising computing new error correct ion codes for the updated parity cluster.

28. The method of claim 27, further comprising writing the updated parity cluster onto the disk of the parity drive.

29. The method of claim 28, further comprising reporting that the updated parity has been successfully written.

30. The method of claim 29, further comprising reporting that the new data k' has been successfully written.

31. The method of claim 19, wherein disk array system comprises a RAID system.

32. The method of claim 19, wherein the data cluster comprises a cluster of sectors.

33. The method of claim 19, wherein the data cluster comprises a group of sector clusters.

34. The method of claim 19, wherein saving the data cluster in memory comprises saving the data cluster in a cache memory.

35. The method of claim 19, wherein generating the new parity p' comprises implementing an exclusive OR operation onto the data k, the parity p, and the new data k', as follows:

$$p' k \oplus k' p.$$

36. A method of implementing a write command in a multiple level disk array system, comprising:

receiving a write command to write new data k';

issuing a read with intent to update command to a data storage device to read the data k to be updated;

reading the data cluster containing the data k;

saving the data cluster in a data drive memory;

issuing a read with intent to update command to a parity storage device to read a parity p to be updated that corresponds to the data k;

reading the parity cluster containing the parity p;

saving the parity cluster in a parity drive memory;

generating a new parity p' that corresponds to the new data k';

writing the new data k' on the data drive;

writing the new parity p' on the parity drive; and wherein the data cluster and the parity cluster are integrated sector format clusters.

37. A system for updating data k in a multiple level disk array system, comprising:

a controller for receiving a write command to write new data k';

the controller issuing a read command to a data storage device to read a data cluster containing the data k to be updated;

the controller reading the data cluster containing the data k;

the controller saving the data cluster in a memory;

the controller issuing a read command to a parity storage device to read a parity cluster containing a parity p to be updated that corresponds to the data k;

the controller reading the parity cluster containing the parity p;

the controller saving the parity cluster in the memory;

the controller generating a new parity p' that corresponds to the new data k';

the controller writing the new data k' on the data drive;

the controller writing the new parity p' on the parity and wherein the data cluster and the parity duster are integrated sector format clusters.

38. The system of claim 37, wherein disk array system comprises a RAID system.

39. The system of claim 37, wherein the data cluster comprises a cluster of sectors.

40. The system of claim 37, wherein the memory comprises a cache memory.

41. The system of claim 37, wherein the data cluster comprises a cluster of sectors.

42. The system of claim 37, wherein the data cluster comprises a group of sector clusters.

* * * * *